United States Patent [19]

Tillander

[11] Patent Number: 5,634,786
[45] Date of Patent: Jun. 3, 1997

[54] INTEGRATED FUEL/AIR RATIO CONTROL SYSTEM

[75] Inventor: Thomas Tillander, Bay Village, Ohio

[73] Assignee: North American Manufacturing Company, Cleveland, Ohio

[21] Appl. No.: 346,787

[22] Filed: Nov. 30, 1994

[51] Int. Cl.$^6$ .................................................. F23N 5/18
[52] U.S. Cl. ................................................ 431/90; 431/12
[58] Field of Search ............................ 431/12, 89, 90

[56] References Cited

U.S. PATENT DOCUMENTS

| | | | |
|---|---|---|---|
| 4,261,508 | 4/1981 | Broach | 236/15 BD |
| 4,468,192 | 8/1984 | Jaeger | 431/20 |
| 4,498,861 | 2/1985 | Suzuki et al. | 431/12 |
| 4,498,863 | 2/1985 | Hanson et al. | 431/89 |
| 4,509,913 | 4/1985 | Lorenz et al. | 431/90 |
| 4,585,161 | 4/1986 | Kusama et al. | 236/15 BD |
| 4,631,022 | 12/1986 | Ferri et al. | 431/90 |
| 4,645,450 | 2/1987 | West | 431/12 |
| 4,793,798 | 12/1988 | Sabin | 431/90 |
| 4,856,487 | 8/1989 | Furuya | 123/574 |
| 4,927,351 | 5/1990 | Hagar et al. | 431/12 |
| 5,106,294 | 4/1992 | Profos | 431/12 |
| 5,190,452 | 3/1993 | Katchka et al. | 431/12 |
| 5,251,148 | 10/1993 | Haines et al. | 364/509 |

FOREIGN PATENT DOCUMENTS

| | | | |
|---|---|---|---|
| 0428373 | 5/1991 | European Pat. Off. | 431/12 |
| 540449 | 10/1955 | France | 431/90 |
| 0131621 | 10/1980 | Japan | 431/89 |
| 0065518 | 4/1982 | Japan | 431/90 |
| 0081420 | 5/1984 | Japan | 431/89 |
| 0157420 | 9/1984 | Japan | 431/90 |
| 0195813 | 8/1991 | Japan | 431/90 |

*Primary Examiner*—Carl D. Price
*Attorney, Agent, or Firm*—Jones, Day, Reavis & Pogue

[57] ABSTRACT

An integrated fuel-to-air control system is disclosed in which fuel and air pressure differential sensors are provided for measuring the flow pressure differential of fuel and air across orifices in the respective flow paths. The pressure differential sensors generate signals which are characteristic of the pressure differentials across the orifices.

A control system is provided which includes an electronic comparator for receiving the pressure differential signals and generating a difference signal corresponding to the difference between these signals. The difference signal in turn is transmitted to a valve actuator which respectively opens or closes a valve in the fuel flow path in order to vary the fuel flow pressure differential so as to achieve a desired fuel-to-air ratio with the oxidant flow pressure differential. The fuel flow pressure is varied up or down as necessary until the difference signal reaches zero at the desired ratio.

The present invention may include a temperature sensor which communicates a temperature signal for pre-heated air to the control system. The control system responds to the temperature signal by compensating the fuel flow to correspond to temperature-related changes in air density which affect the fuel-to-air ratio. The present invention also includes means for decreasing the fuel flow automatically so as to create an excess of air for air pressures below the excess air breakpoint.

20 Claims, 5 Drawing Sheets

INTEGRATED FUEL/AIR RATIO CONTROL SYSTEM

BACKGROUND OF THE INVENTION

The present invention relates to a volume flow control system within an enclosed pressurized delivery system. More specifically, the invention relates to a means for automatically controlling the relative volume flow ratio of liquid or gaseous materials within an enclosed pressurized tubing system incorporating valves for flow control. The present system has particular applicability to the control of the fuel-to-air ratio mix in an industrial furnace in addition to process heaters and boilers.

In an industrial furnace, fuels such as natural gas or fuel oils are ignited in the presence of an oxidant, typically air, to create a high temperature flame. Such furnaces are used in the steel industry to melt aluminum, to fire refractory, to reheat steel, and in heat treating.

The efficiency of such furnaces depends largely on the proper control of the fuel-to-air ratio mix during combustion. Optimum combustion efficiency occurs when the fuel-to-air ratio is stoichiometric, i.e. when the mixture is at the precise proportion where all of the fuel is chemically reacted with all of the available oxygen, so as to produce the maximum amount of heat energy available from the reaction. If the fuel-to-air ratio is poorly controlled, e.g., if the furnace is operated with excessive air, the combustion will be very inefficient. The excess air does not contribute to the combustion process yet absorbs much of the flame's heat. Therefore, the flame loses much of its available heat to the excess air. Such inefficiency translates into considerable additional operating costs. Thus, it is desirable to control the fuel-to-air ratio so as to minimize excessive air during combustion.

In some prior furnace systems, control over the fuel-to-air ratio is achieved by mechanically measuring the pressure differentials across an orifice in the flow conduits of the air and the fuel. The measured pressure differentials are then mechanically transmitted to a hydraulically or pneumatically controlled valve actuator which opens or closes a fuel or air valve in order to correct for imbalances in the fuel-to-air ratio. Such mechanical controls work well on small systems, but as heat requirements of systems increase, requiring larger pipe diameters, the size and cost of the mechanical regulators increases sharply. The springs and diaphragms of such mechanical regulators become so large that their mass affects the operation of the regulator. The result is a large and expensive regulator which does not provide satisfactory control.

It is common in modern burner systems to pre-heat the air used in the burner. Such systems typically use recuperators which transfer the heat from the exhaust to the combustion air in order to efficiently maximize the use of the available heat. Such pre-heated air systems are particularly challenging for mechanical regulators. Volume flow control systems assume that the density of the materials being controlled and monitored are constant so that there is a direct relationship between volume and mass. In pre-heated air systems this assumption is not valid and temperature-related changes in air density must be taken into account.

Mechanical regulators can be used in pre-heated air systems if they are set to measure air flow prior to heating. However, recuperator systems tend to develop leaks which cause a portion of the heated air to be lost before reaching the burner. Some mechanical temperature compensation techniques employ passing a sample of heated air over a thermostatic metal strip that controls a specially tapered plug which in turn controls the amount of pressure bleed from the air measurement side of a mechanical regulator. Such elements are cumbersome and involve extra piping and more parts which tend to wear out and age under the high operating temperatures.

Mechanical control systems otherwise suffer from undesirable performance factors. It is sometimes desirable to operate the furnace under conditions of low heat input which require excess air. Mechanical control systems are not available which can be automatically programmed for excess air adjustments. Also, mechanical controls are prone to sticking and wearing. Therefore, such systems do not offer reliable maintenance of the desired fuel-to-air ratio. Thus, strictly mechanical control systems offer limited performance options and are unsatisfactory for modern burner systems.

In typical modern burner systems, the limitations of mechanical systems are avoided by using digital computer combustion control systems. Such systems use a distributed array of electronic sensors which monitor various parameters such as air temperature, air flow, fuel flow, and the percent of oxygen present in the exhaust gases. This sensor data is fed back to a computer microprocessor which calculates and implements the fuel or air flow adjustments needed to maintain the desired fuel-to-air ratio.

While digital computer systems offer greater control over combustion and all the related parameters, such systems are highly complex, requiring a network of sensors to be distributed over a large area. Also, the various components are bulky and expensive. Thus, computer combustion control, while offering benefits over the prior mechanical controls, also suffers from its own drawbacks.

SUMMARY OF THE INVENTION

In view of the above-noted disadvantages encountered in prior systems, it is therefore an object of the present invention to provide a fuel-to-air ratio control system for use in a liquid or gaseous flow control operation.

It is another object of the present invention to provide a control system which provides and maintains a desired fuel-to-air ratio in a combustion process in which a flow rate is adjusted in response to monitored pressure differentials.

It is still another object of the present invention to provide a control system which adjusts a flow rate in order to compensate for temperature-related density variations.

It is a further object of the present invention to provide a control system which maintains a proper fuel-to-air ratio as furnace heat input is lowered to a point near a desired excess air breakpoint which allows for a progressively leaner ratio as heat input is lowered below the breakpoint to increase thermal turndown and provide volume for maintaining furnace pressure.

It is another further object of the present invention to provide a control system which is contained in an integrated package in which the unit is small and easy to install and which is constructed from inexpensive components.

The above and other objects of the present invention are realized in the integrated fuel/air control system of the present invention in which a fuel pressure sensor arrangement is provided for measuring the flow pressure differential of a fuel across an orifice in the fuel flow path. The fuel pressure sensor arrangement generates a signal which is characteristic of the fuel pressure differential across the orifice. An oxidant pressure sensor is similarly provided for measuring the flow pressure differential of an oxidant across an orifice in the oxidant flow path. The oxidant pressure sensor arrangement generates a signal which is characteristic of the oxidant pressure differential across the orifice. Of course, the operation of the present invention is not limited to pressure measurement. Fluid flow can also be measured by other techniques such as anemometry.

A control system is also provided which includes an electronic comparator for receiving the fuel and oxidant pressure differential signals and generating a difference signal corresponding to the difference between these signals. The difference signal in turn is transmitted to a valve actuator which respectively opens or closes a valve in the fuel flow path so as to vary the fuel flow pressure differential in order to achieve the desired fuel-to-air ratio with the oxidant flow pressure differential. The fuel flow pressure is varied up or down as necessary until the difference signal reaches zero at the desired ratio.

In addition to the above, the present invention may include a temperature sensor which communicates a temperature signal for pre-heated air to the control system. The control system responds to the temperature signal by compensating the fuel flow to correspond to temperature-related changes in air density which affect the fuel-to-air ratio. The present invention also includes means for decreasing the fuel flow automatically so as to create an excess of air for air pressures below the excess air breakpoint.

The present invention provides the above functions in addition to offering an integrated package which does not require an elaborate and complex distributed network of the elements. The invention is compact and can be easily inserted into areas where space considerations are important. The above and other features and advantages of the invention will become apparent from consideration of the following detailed description of the invention which presents a preferred embodiment of the invention as is particularly illustrated in the accompanying drawings.

DETAILED DESCRIPTION OF THE INVENTION

Figure 1:
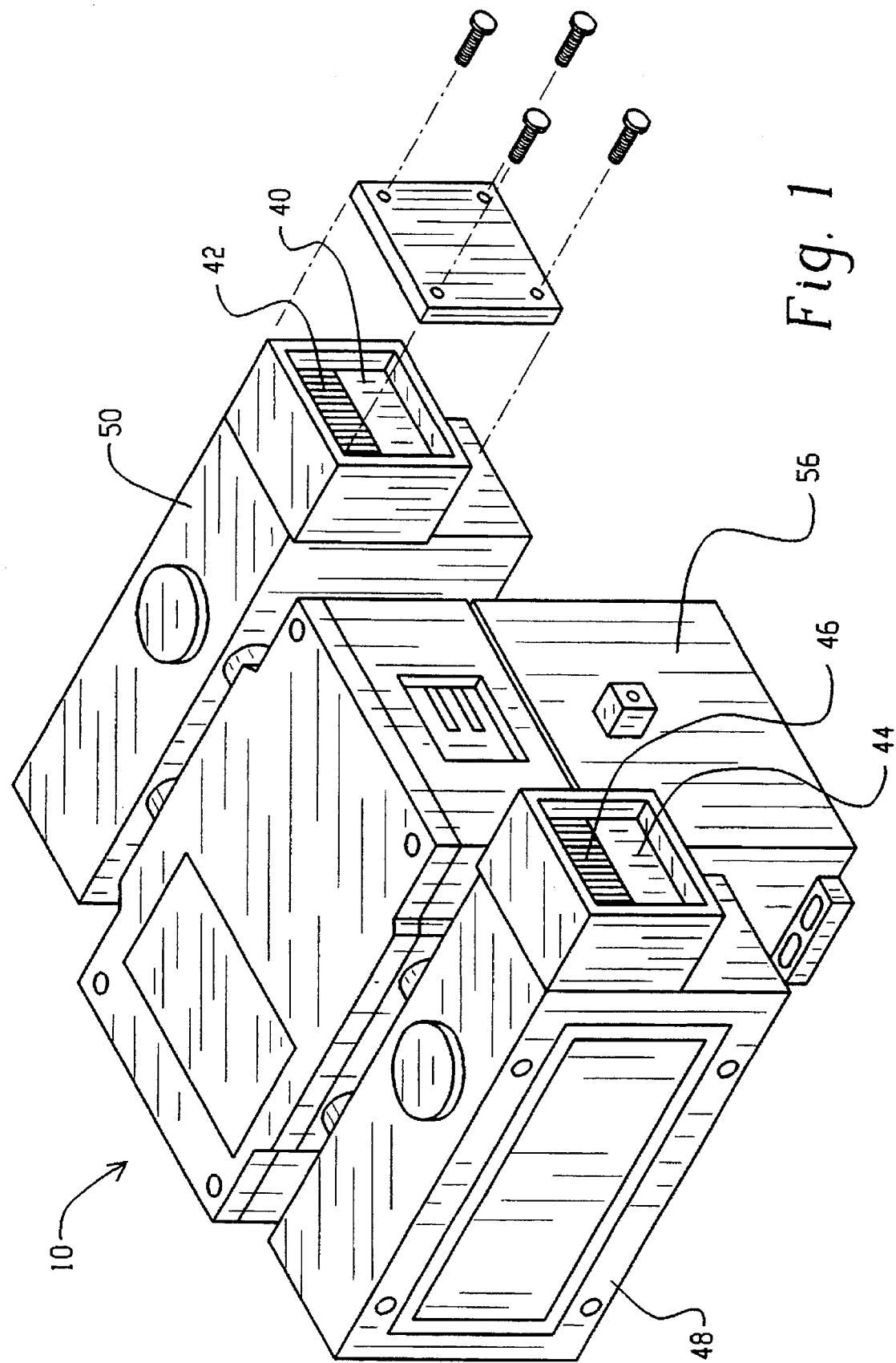
FIG. 1 is an oblique view illustrating the preferred embodiment of the integrated fuel/air ratio control system as according to the present invention.
Figure 2:
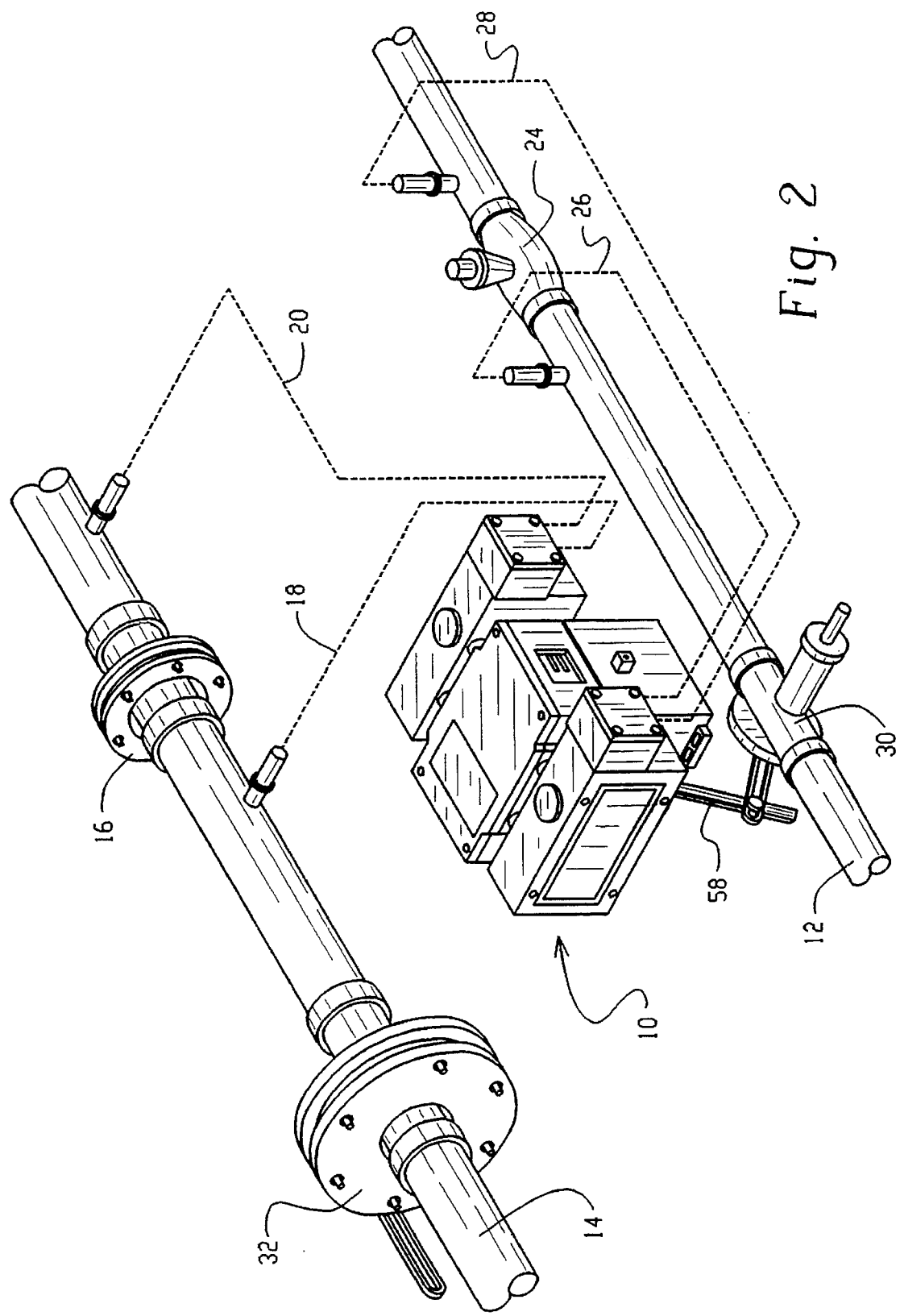
FIG. 2 illustrates the preferred embodiment in an operative configuration with two fluid conduits.

Referring now to FIGS. 1 and 2 the general configuration and operative assembly is shown for the integrated fuel/air ratio control system 10 as according to the preferred embodiment of the present invention. The present control system 10 is designed to control the flow pressure of fuel in a fuel line 12 in response to the flow pressure in an air line 14. A measure of the pressure in the air line is determined by measuring the pressure drop across an orifice plate 16. The flow pressure of air delivery to the burner follows directly from this pressure drop according to the known relationships of the laws of pressure and flow. The pressure difference across the orifice plate 16 is measured by impulse lines 18, 20 which fluidly connect either side of the orifice 16 to an air pressure manifold 40. The air pressure manifold 40 is in turn fluidly connected to a piezoelectric pressure transducer 42 which generates a DC voltage signal representative of the air pressure difference.

Figure 3:
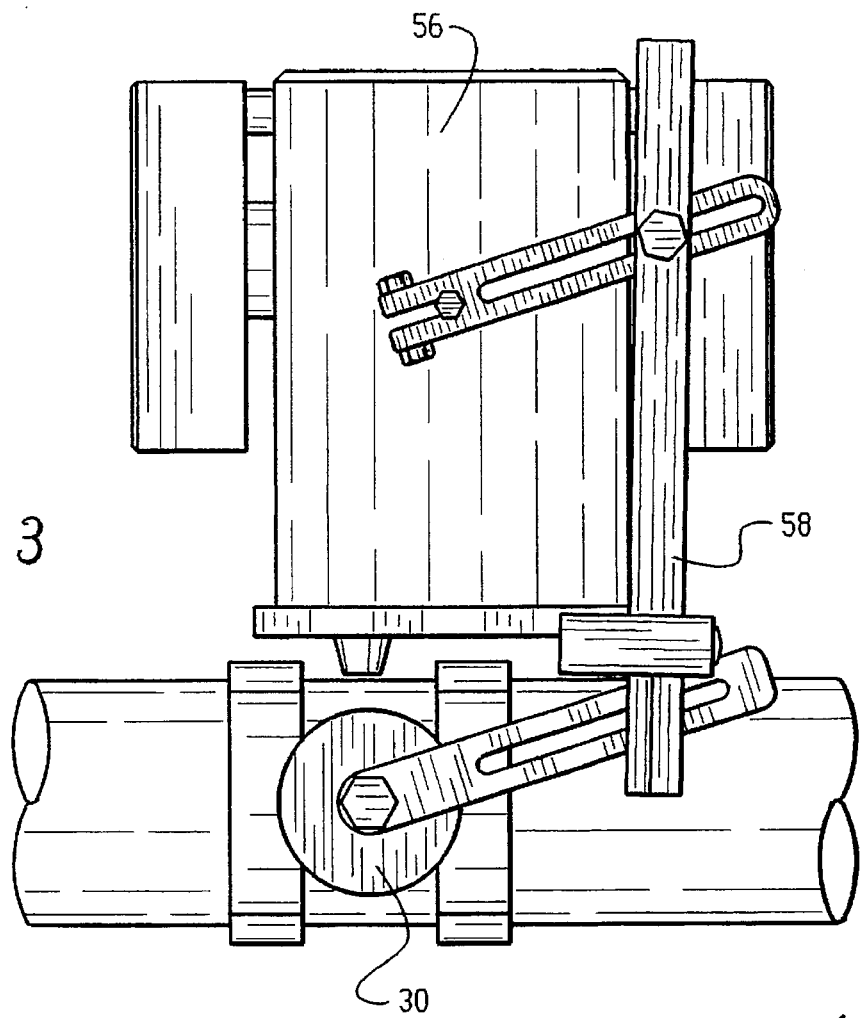
FIG. 3 illustrates the valve actuation assembly as according to the preferred embodiment.
Figure 4:
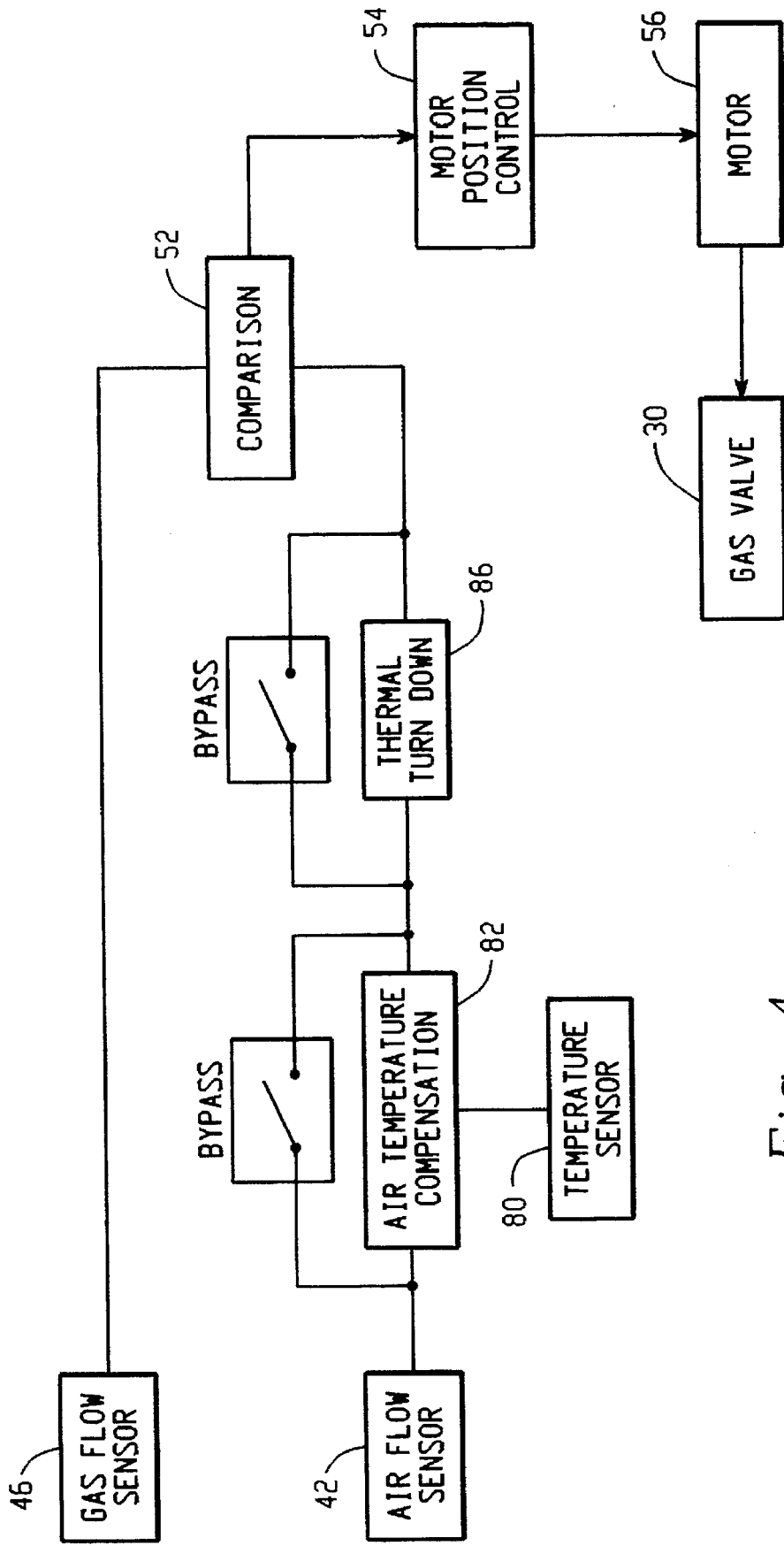
FIG. 4 is a flow chart depicting the operation of the invention according to the preferred embodiment.

The present control system 10 also measures flow pressure in the fuel line 12 in a similar manner. The measure of fuel flow pressure is taken across fuel orifice 24 is measured by fuel impulse lines 26, 28. (The fuel orifice 24 is manually adjustable in order to permit optimal control over the fuel-to-air ratio.) The fuel impulse lines 26, 28 are fluidly connected to gas manifold 44 which is in turn connected to a piezoelectric transducer 46 (such as a SenSym #142SC01D) which generates a DC voltage signal representative of the fuel pressure difference. In the preferred embodiment shown in the figures, the air and fuel pressure signals are brought across to the first housing 48 which contains a controller wiring section including the appropriate signal processing circuitry. The second housing 50 contains the field wiring terminals for operator interface (discussed below.) As shown in FIG. 4, after pressure measurements are made with transducers 42, 46, an error amplifier 52 is used to perform a comparison of the signals. The error amplifier 52 is used to instruct a motor position control 54 to send a control signal corresponding to the gas and air pressure difference to the motor 56. In the preferred embodiment, the motor 56 is a Honeywell Modutrol IV M6284 that completes a full 90° stroke in 30 seconds. As is seen in FIGS. 2 and 3, the motor 56 is connected to a linkage 58 which actuates the gas valve 30 in response to the control signal. The gas valve 30 and linkage 58 are set to give substantially full valve travel in response to full motor travel. The valve linkage 58 is manually adjustable in order to locate satisfactory high and low limits. In this manner, the control system 10 actuates the gas valve 30 in order to vary the gas flow in order to maintain gas flow pressure in a precise ratio with the air pressure.

The control system 10 uses the measured air flow pressure for establishing a set point for the gas flow pressure and in this way controls the fuel-to-air ratio. In burner systems, air flow is varied using a valve 32 which is varied by a control motor. With the present invention, fuel flow is automatically varied in response to changes in air flow in order to maintain a constant proportional fuel-to-air ratio throughout the combustion cycle. In the preferred embodiment, the fuel differential pressure and air differential pressure ratio would be about 1:1 so that the gas differential pressure would match the air differential pressure. The size of the fuel and air orifices 24, 16 are chosen to typically provide a 1:1 pressure difference ratio which offers a fuel-to-air ratio of about 10% excess air over stoichiometric. However, other ratios would be chosen to provide particular flames with certain desired temperatures and other flame characteristics.

Figure 5:
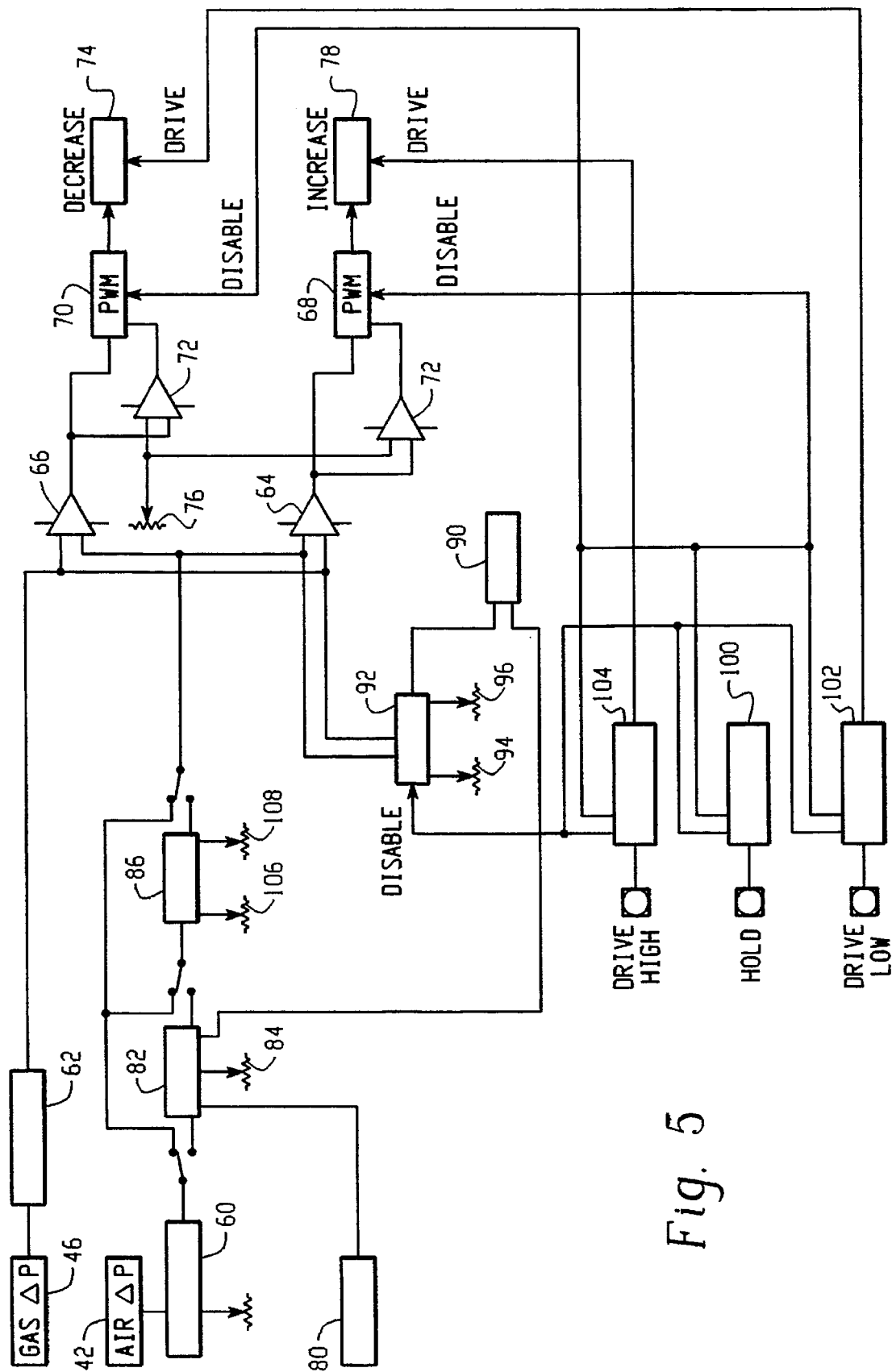
FIG. 5 is a schematic illustrating the circuit configuration of the preferred embodiment.

FIG. 5 most particularly illustrates the operation of the control system of the preferred embodiment. The gas and air transducers 42, 46 each send respective DC voltage signals to the error amplifier 52 which generates the control signal. Each respective pressure signal is passed through respective signal conditioning elements 60, 62 which are calibrated to provide that signals representing the desired ratio have equivalent amplitudes. The conditioned signals are then passed to the error amplifier 52, which includes parallel comparators 64, 66 that generate signals indicating the amplitude of the difference between the respective gas and setpoint signal generated from the air pressure signals. These DC signals are processed through first and second Pulse Width Modulators (PWM's) 68,70 which respectively convert the error amplifier output into pulses that have a duty cycle which corresponds to the amplitude of the difference signal. The error amplifier output goes to a set of comparators 72 which are set to a "dead band" 76 which stop the PWM output when the correct ratio is achieved, so as to prevent overshoot.

Each PWM output is connected to the motor position control 54 which directs the reversible motor 56 to operate in either clockwise or counterclockwise mode in order to respectively open or close the fuel valve 30 depending on the state of the difference signal. A first PWM 68 outputs a positive signal to indicate an increase in gas flow while a second PWM 70 outputs a positive signal to decrease gas flow. The motor position control 54 includes first and second motor drive circuits 78, 74 which each include an opto-triac which respectively control current flow to the motor 56 for the duty cycle corresponding to the respective PWM output, thereby actuating the motor in forward or backward mode, thus opening or closing the gas valve 30. In this way, gas flow to the burner is varied in order to maintain the predetermined fuel-to-air ratio.

The motor 56 of the present invention also includes a motor position sensor (not shown) which indicates motor stroke position. The output of this sensor can be outputted to a display or other operator interface for verifying motor position. The motor 56 also includes limit switches (not shown) which signal that the motor 56 is at the limit of its stroke. These elements are provided in order to permit the control system to accurately determine motor position.

The preferred embodiment also offers temperature compensation in order to adjust the fuel flow set point in order to compensate for the lower air density when using preheated air. Air density varies with the temperature as a proportional relationship, and so a simple mathematical operation is used to correct the fuel setpoint based on the temperature and therefore the density of the air. A temperature sensor 80, preferably a thermocouple, is inserted in the air line 14. The thermocouple transmits temperature data to a temperature compensation circuit 82 which includes a calibration potentiometer 84 for setting the orifice design temperature.

The orifice design temperature is a standard temperature selected for a given application at which the correction factor is one. Typically it is selected to be the normal temperature of preheated air. The temperature compensation circuit 82 compensates for the temperature-related air density differences by changing the fuel set point according to a correction factor sufficient to offset the difference in air density, so as to maintain a corresponding fuel-to-air ratio. The correction factor is determined by the following formula:

$$\frac{273 + \text{(orifice design temperature)}}{273 + \text{(air temperature)}}$$

which measures the absolute temperature in Kelvins. For example, if the orifice design temperature is 200° C. and the air temperature at furnace start up is 20° C., the correction factor is 1.614. Thus, the air pressure difference measurement is multiplied by 1.614 to generate the gas pressure difference setpoint.

The present invention also allows for desired thermal turndown. In certain industrial processes, it is desirable to operate a furnace under low fire, low heat input conditions, e.g. when metal ingots are "soaked" at a certain temperature to obtain a desired metallurgical result. However, at such low firing rates, air and fuel pressures are often insufficient to produce adequate mixing, resulting in inefficient combustion and poor flame characteristics. In such situations a point is selected on the flow rate curve (shown in FIG. 6) where the efficiency of operating near stoichiometric ratio is sacrificed in favor of mixing and temperature uniformity. This point is called the Excess Air Breakpoint.

Figure 6:
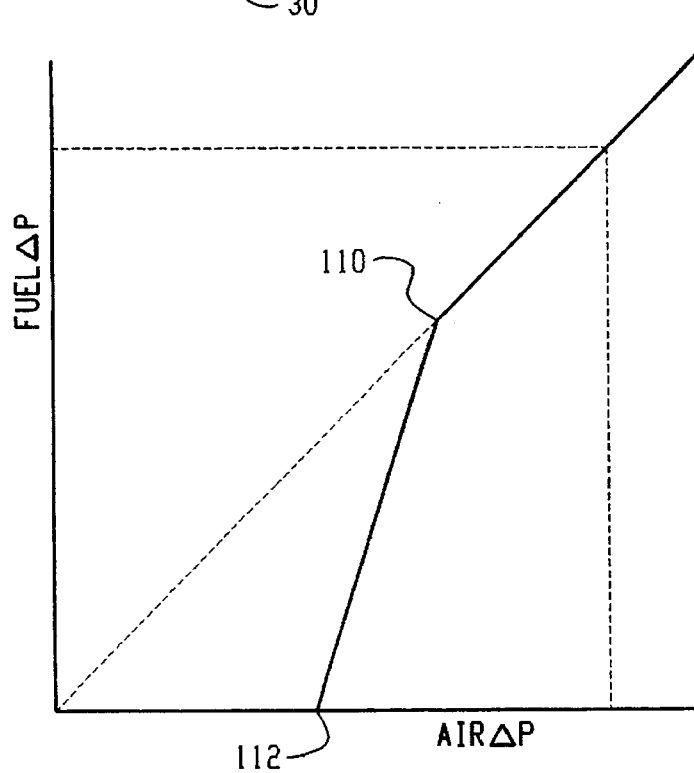
FIG. 6 is a graph which illustrates the relationship between fuel pressure difference as a function of air pressure difference as according to the operation of the excess air feature of the preferred embodiment of the present invention.

As shown on the flow rate curve of FIG. 6, the gas pressure drop across the gas orifice matches the air pressure drop across the air orifice, i.e. a 1:1 fuel/air pressure difference ratio is followed for pressures above the excess air breakpoint 110. For pressures below this point, the gas pressure is controlled so that an excess volume of air is supplied in order to maintain proper mixing and temperature uniformity.

The amount of excess air is determined by the selection of the air bias 112. In order to permit the desired thermal turndown while maintaining an adequate flame, it is sometimes necessary to lower the fuel-to-air ratio to levels lower than 1:50, depending on the desired heat input. The air bias 112 is the air flow point on the graph at which fuel flow is minimum. The effect on overall efficiency of operating with excess air at low fire is small since only a small amount of fuel is being burned during this period. To achieve the same turndown with a mechanical system, one would have to run off-ratio at all but the highest firing rate.

Thermal turndown is automatically effected in the present invention by a breakpoint circuit 86 which is calibrated for a desired air flow (or heat input.) The breakpoint circuit 86 automatically moves the set point for the fuel to a level which corresponds to the desired excess air ratio. The breakpoint circuit 86 includes a breakpoint potentiometer 106 for establishing a variable air pressure difference threshold which corresponds to the excess air breakpoint 110. Also included is an air bias potentiometer 108 for varying the air bias 112. These potentiometers establish the relationship between gas pressure and excess air as according to FIG. 6.

The breakpoint circuit 86 can also be used with the temperature compensation circuit 82 to move the set point according to both of these respective input factors. Each of these features can also be bypassed, as required for the specific combustion system.

The preferred embodiment also includes an alarm feature. The temperature compensation circuit 82 is in communication with an alarm relay 90. If the thermocouple 80 should fail to operate, i.e., if it should open, the circuit 82 actuates the alarm relay 90. Also, the invention includes a tracking error alarm 92 for indicating if the measured fuel differential pressure should drift outside of acceptable tolerances, the tracking error alarm 92 establishes a "window" of acceptable tolerances about the fuel setpoint. For example, the window can be set to +/−0.1 inch of water. In the event that the control system 10 fails to control the measured fuel differential pressure to within the 0.1 inch tolerance, the alarm 92 activates the alarm relay 90. The tolerance set point for the window can be manually adjusted using the alarm window potentiometer 94.

During rapid transitions, such as during start up in which the burner changes from low fire to high fire, a tracking error is not uncommon. To avoid nuisance alarms, the circuit includes an alarm delay which is manually adjusted with an alarm delay potentiometer 96. The alarm delay prevents the alarm from sounding until the ratio has been out of tolerance for an unacceptable interval of time, for example, four seconds.

The preferred embodiment of the invention also includes several control override features. The hold override 100 prevents the motor from varying the rate of fuel flow. The hold override 100 is useful for situations where cooling air only is required by the system. This override disables both the first and second PWM's 68, 70 and holds the fuel valve position constant irrespective of changes in air flow pressure. A drive low override 102 is used for situations such as low fire start up when fuel flow is required to be minimum. This override instructs motor drive circuit 74 to actuate the motor 56 to drive the valve 30 to minimum flow. A drive high override 104 is used to instruct motor drive circuit 78 to actuate the motor 56 to open the valve 30 to its maximum. This override is used for system diagnostics and setup and also manual override. In the use of all control overrides, the tracking error alarm 92 is disabled so as to avoid nuisance alarms. Operator interfaces for the control overrides are accessed from the second housing 50.

The present invention as described hereinabove has several advantages over previous systems. The present control system 10 has a size advantage since it is compact and has the sensing, processing and actuating elements contained within an integrated package. Thus, the device of the present invention can be easily installed and maintained and adapted to fit into a small area. The present invention can also be used to accommodate a large variety of pipe diameters. The valves commonly used in fluid delivery applications have sufficiently low torques so that motors within the scope of the invention can be used to easily open and close them. Should still larger-valves be required, the present electronic package can be attached to a motor of any size, remaining within the scope of the invention.

The invention of the preferred embodiment is simple in construction and is made from inexpensive components. The invention can thus be manufactured simply and inexpensively. In the preferred embodiment, the signal processing is performed by analog components. However, the control system 10 can operate with digital electronic components and still remain within the scope of the invention. Also in the preferred embodiment, the fuel flow is varied in response to changes in air flow. However, the invention can also be adapted to vary the air flow in response to changes in the fuel flow. Additionally, the present invention can be used in a variety of fluid control applications where it is desirable to maintain precise control over the ratios of the fluids. For example, the invention can be used in industrial chemical processing system applications.

The foregoing description of the preferred embodiment has been presented for purposes of illustration and description. It is not intended to be limiting insofar as to exclude other modifications and variations such as would occur to those skilled in the art. Any modifications or variations such as would occur to those skilled in the art in view of the above teaching are contemplated as being within the scope of the invention.

What is claimed is:

1. An integrated apparatus for regulating the flow of a fluid comprising:

a first pair of impulse lines each having first and second respective ends, wherein each first end is attached to a first fluid line at either side of a respective orifice;

a first sensor arrangement attached to the respective second ends of said first pair of impulse lines for measuring the pressure differential across the respective orifice in order to generate a first flow signal corresponding to the flow of a first fluid;

a second pair of impulse lines each having first and second respective ends, wherein each first end is attached to a second fluid line at either side of a respective orifice;

a second sensor arrangement attached to the respective second ends of said second pair of impulse lines for measuring the pressure differential across the respective orifice in order to generate a second flow signal corresponding to the flow of a second fluid;

a control system including parallel comparators for receiving and comparing said first and second signals and generating respective control signals, wherein the control signals are difference signals which correspond to the state and the amplitude of the difference between the first and second flow signals;

a valve actuator assembly for receiving the respective difference signals and actuating a valve in line with the first fluid so as to respectively either increase or decrease the flow of the first fluid to a predetermined ratio with the flow of the second fluid depending on the state of the difference signals; and a housing for receiving said first and second sensor arrangements, said control system and said valve actuator so as to provide an integrated control assembly.

2. The apparatus of claim 1 wherein first and second sensor arrangements are each respective piezoelectric transducers which generate voltages corresponding to each respective pressure differential.

3. The apparatus of claim 1 wherein the comparator of said control system includes an analog comparator.

4. The apparatus of claim 3 wherein said valve actuator includes a reversible AC motor which is driven to respectively open or close the valve conditional upon the state of the difference signal.

5. The apparatus of claim 1 wherein the first fluid is a fuel to be combusted and the second fluid is an oxidant.

6. The apparatus of claim 5 wherein the control system includes means for varying the predetermined ratio so as to produce an excess of air in order to effect thermal turndown.

7. The apparatus of claim 5 wherein the control system includes a temperature sensor for creating a temperature signal corresponding to the temperature of the air and wherein the control system includes means for compensating for temperature-related air density differences in response to said temperature signal.

8. The apparatus of claim 7 wherein the control system includes an alarm for indicating a malfunction with the temperature sensor.

9. The apparatus of claim 1 wherein the control system includes an override for bypassing the control signal.

10. The apparatus of claim 9 wherein the override prevents the valve actuator from actuating the valve.

11. The apparatus of claim 9 wherein the override permits manual control of the valve actuator.

12. The apparatus of claim 1 wherein a window of acceptable tolerance is established around the fuel setpoint and wherein an alarm is activated if the fuel flow drifts outside the window.

13. An integrated apparatus for regulating the flow of fuel to a burner in a combustion system, said apparatus comprising:

a first pair of impulse lines each having first and second respective ends, wherein each first end is attached to a fuel line at either side of a respective orifice;

a fuel sensor arrangement attached to the respective second ends of said first pair of impulse lines for measuring the flow pressure differential of a fuel across an orifice in the fuel line, said fuel sensor arrangement generating a fuel pressure differential signal;

a second pair of impulse lines each having first and second respective ends, wherein each first end is attached to an oxidant line at either side of a respective orifice;

an oxidant sensor arrangement attached to the respective second ends of said first pair of impulse lines for measuring the flow pressure differential of an oxidant across an orifice in the oxidant line, said oxidant sensor arrangement generating an oxidant pressure differential signal;

a control system including parallel comparators for receiving said fuel and oxidant pressure differential signals and for generating respective control signals corresponding to the difference between these respective pressure differential signals;

a valve actuator responsive to said difference signal for respectively opening and closing a valve in the fuel flow path so as to vary the fuel flow pressure differential to a predetermined ratio with the oxidant flow pressure differential at which the difference signal is zero; and a housing for receiving said first and second sensor arrangements, said control system and said valve actuator so as to provide an integrated control assembly.

14. The apparatus of claim 13 wherein the control system includes means for varying the predetermined ratio so as to produce an excess of air in order to effect thermal turndown.

15. The apparatus of claim 13 wherein the control system includes a temperature sensor for creating a temperature signal corresponding to the temperature of the air and wherein the control system includes means for compensating for temperature-related air density differences in response to said temperature signal.

16. The apparatus of claim 15 wherein the control system includes an alarm for indicating a malfunction with the temperature sensor.

17. The apparatus of claim 13 wherein the control system includes an override for bypassing the control signal.

18. The apparatus of claim 17 wherein the override prevents the valve actuator from actuating the valve.

19. The apparatus of claim 17 wherein the override permits manual control of the valve actuator.

20. The apparatus of claim 13 wherein a window of acceptable tolerance is established around the fuel setpoint and wherein an alarm is activated if the fuel flow drifts outside the window.

* * * * *